United States Patent
Bader et al.

(10) Patent No.: US 8,290,708 B2
(45) Date of Patent: Oct. 16, 2012

(54) METHOD AND SYSTEM FOR DETERMINING A SERVICING REQUIREMENT

(75) Inventors: Axel Bader, Friedberg (DE); Sven Hansen, Berstadt (DE); Steffen Schmidt, Aalen (DE); Kim Henrich, Gelnhaar (DE)

(73) Assignee: ABB Patent GmbH, Ladenburg (DE)

( * ) Notice: Subject to any disclaimer, the term of this patent is extended or adjusted under 35 U.S.C. 154(b) by 2068 days.

(21) Appl. No.: 11/153,042

(22) Filed: Jun. 15, 2005

(65) Prior Publication Data

US 2006/0287768 A1  Dec. 21, 2006

(30) Foreign Application Priority Data

Jun. 15, 2004 (DE) .................. 10 2004 028 565

(51) Int. Cl.
*G01C 21/10* (2006.01)
(52) U.S. Cl. .................... 701/500; 701/541
(58) Field of Classification Search .................. 700/12, 700/15, 16, 254; 340/3.43, 3.44; 702/176, 702/184
See application file for complete search history.

(56) References Cited

U.S. PATENT DOCUMENTS

| | | | | |
|---|---|---|---|---|
| 5,446,672 A * | 8/1995 | Boldys | | 700/174 |
| 5,566,092 A | 10/1996 | Wang et al. | | |
| 5,754,451 A * | 5/1998 | Williams | | 702/185 |
| 6,606,539 B2 * | 8/2003 | Raab | | 700/245 |
| 6,615,103 B2 | 9/2003 | Fujishima et al. | | |
| 7,010,386 B2 * | 3/2006 | McDonnell et al. | | 700/175 |
| 2003/0014149 A1 | 1/2003 | Kreidler et al. | | |
| 2004/0210352 A1 | 10/2004 | Bayer et al. | | |
| 2005/0010377 A1 * | 1/2005 | Stake et al. | | 702/188 |
| 2005/0166413 A1 * | 8/2005 | Crampton | | 33/503 |
| 2005/0216125 A1 * | 9/2005 | Huston et al. | | 700/258 |

FOREIGN PATENT DOCUMENTS

| | | |
|---|---|---|
| DE | 44 47 288 A1 | 7/1995 |
| DE | 196 49 643 A1 | 6/1998 |
| DE | 101 20 943 A1 | 11/2002 |
| DE | 101 52 765 A1 | 5/2003 |
| EP | 0 791 872 A1 | 8/1997 |
| EP | 1 406 137 A2 | 4/2004 |

* cited by examiner

*Primary Examiner* — Khoi Tran
*Assistant Examiner* — Nicholas Kiswanto
(74) *Attorney, Agent, or Firm* — Laurence A. Greenberg; Werner H. Stemer; Ralph E. Locher

(57) ABSTRACT

A method determines the servicing requirements of axes of a robot arm of an industrial robot. The data of a movement sequence of at least one axis during at least one working cycle of the industrial robot is made available. The rotational movements of the at least one axis are established on the basis of the data, and a servicing interval for the at least one axis is determined by an assessment of the rotational movements established. A system for determining a servicing requirement performs the method.

10 Claims, 5 Drawing Sheets

| | Revolutions | Index | Hours per Day | Hours per 5-Day Week |
|---|---|---|---|---|
| Axis 1 | 43.8 | 18 % | 3.00 | 15.0 |
| Axis 2 | 45.1 | 19 % | 3.16 | 15.8 |
| Axis 3 | 63.7 | 27 % | 4.50 | 22.5 |
| Axis 4 | 19.7 | 08 % | 1.33 | 06.5 |
| Axis 5 | 18.6 | 08 % | 1.33 | 06.5 |
| Axis 6 | 49.0 | 20 % | 3.33 | 16.65 |
| | 12 | 14 | 16  18 | 20 |

METHOD AND SYSTEM FOR DETERMINING A SERVICING REQUIREMENT

BACKGROUND OF THE INVENTION

Field of the Invention

The invention relates to a method and a system for determining a servicing requirement of axes of a robot arm of an industrial robot.

It is generally known that robots have to be serviced at certain time intervals. For the moving parts of the robot, such as the axes and transmissions of the robot arm for example, the servicing requires that they are lubricated or the transmission oil is changed. Other components of the robot, such as cable units for example, that are likewise subjected to loading by the movement of the robot arm undergo a visual or electrical check to ascertain locations where they are worn or ruptured. Such servicing measures are usually fixed at certain points of time during the expected service life of the robot and become due after a specific number of operating hours or after a certain absolute time period irrespective of any operating hours.

SUMMARY OF THE INVENTION

It is accordingly an object of the invention to provide a method and a system for determining a servicing requirement which overcomes the above-mentioned disadvantages of the prior art methods and devices of this general type, with which a statement concerning a servicing requirement of axes of a robot arm of an industrial robot can be made in the simplest possible way.

Accordingly, the method according to the invention for determining a servicing requirement of axes of a robot arm of an industrial robot has various method steps. The data of a movement sequence of at least one axis during at least one working cycle of the industrial robot are used as a basis for a determination. The rotational movements of the at least one axis are established on the basis of the data. Finally, a servicing interval for the at least one axis is determined by the assessment of the rotational movements.

This achieves the effect that a servicing interval can be specified as a stated time when servicing will be required irrespective of absolute values, such as for example an absolute time interval, or a number of operating hours, which generally also takes into account considerable times when the industrial robot is not moving all its axes. By the method according to the invention, the determined maintenance interval is generally extended considerably in comparison with previously customary intervals, so that the next due servicing time is much later than it is on the basis of the previously known methods.

For the method according to the invention, it is advantageously immaterial whether the data for the movement sequence are measured or read out from a data memory.

The working cycle is used to refer to the processing of various commands that are necessary for executing the task given to the robot. It is usually provided that the industrial robot has to keep repeating this so-called working cycle. In this way, the working cycle is characteristic of the various duties which the industrial robot has to undertake to perform its task. By considering a large number of working cycles for the determination of a servicing requirement, the accuracy is already increased for statistical reasons, that is to say the quality of the statement made concerning the servicing interval is enhanced.

It has been found to be advantageous for the assessment to be carried out on the basis of temporal proportions of a rotational movement. In the case where an axis is considered, for example, a quotient between the time period in which the axis concerned was moved and the overall operating time of the robot may be formed for example as a measure for the assessment. In accordance with this quotient, possibly linked with an empirical value, which again influences the servicing interval on the basis of empirical findings, the servicing interval is correspondingly extended overall.

A further advantageous possibility for carrying out the assessment is to establish the number of completed revolutions for a specific robot axis. In this case, the value for the number of revolutions can be determined very accurately by stating it in fractions of a whole number, since the drive motors of the robot axes usually have a very accurate rotational angle activation of their stepping motors, so that the number of revolutions can be measured very accurately. This assessment method is used in particular when a number of the axes or all the axes of the industrial robot or their movement elements are compared with one another in order to arrive at a statement that is consistently applicable to the robot concerning the expected servicing interval. This is because it is often the case that the motors and drives and the transmissions of the individual axes are configured for the same overall service life, even if they have very different types of construction on account of different loads to which they are subjected.

An advantageous development of the method according to the invention is characterized in that a servicing time for the axis concerned or a common servicing time for all the axes is determined by taking into account the servicing interval determined together with the number of working cycles so far.

From the data on the number of working cycle so far since the last servicing measure, the already elapsed servicing time period is calculated by the generally known calculation methods and the remaining servicing time period is determined on this basis, so that the point of time at the end of the remaining servicing time period is determined as the next due servicing time.

In an advantageous form of the method according to the invention, such a point in time is determined for all the axes, so that generally different possible next due servicing times are calculated for the different axes and the calculation is followed by selection of that point in time which, in temporal terms, lies closest to the current time.

The method according to the invention achieves the overall effect that the unequal, frequent distribution of the movements of individual axes is recognized and brought into a relationship with the production cycle. The servicing cycles are correspondingly adapted. It is also covered by the idea of the invention that the movement elements of the different axes during a working cycle of the industrial robot are taken as a basis for calculating recommendations as to how for example axes subjected to higher loading, that is axes with an increased movement element, can in future be loaded less and certain movement tasks can be taken over by other axes of the industrial robot that are subjected to less loading.

The object is also achieved by a system for determining a servicing requirement of axes of a robot arm of an industrial robot, with a data module, which contains the data of a movement sequence of at least one axis during at least one working cycle of the industrial robot, with an analysis module, with which rotational movements of the at least one axis can be analyzed from the data, and with an assessment module, by which the ascertainment of a servicing interval for the at least one axis is made possible by an assessment of the rotational movements established.

Therefore, only data of a movement sequence of the axis or the axes of the industrial robot are required, forming the basis for the determination of a servicing requirement. In this case, it is immaterial whether a historical database is used or the corresponding data are generated at the time, that is to say can be read into the data module online. The analysis module can filter out from the database those data that specify the rotational movements of a specific axis of a number of axes or all the axes of the industrial robot. Here too it must be stated that it is of no consequence for the system according to the invention whether these data concerning the movement sequence are provided as direct or indirect values. Direct values refer to those values which indicate the movement sequence itself, that is for example directly specify the time period with respect to the operation of a motor of the robot axis, or specify directly the number of degrees for rotation of a motor or rotation of an axis. Indirect values are to be considered as those values which, though constituting the movement sequence, first have to be converted into a value for the movement sequence by transformation, for example a voltage value which has to be interpreted as an operating time, or voltage pulses which have to be counted, each voltage pulse corresponding to a specific number of degrees of rotational movement.

Finally, the establishment of a servicing interval for one axis, a number of axes or all the axes is made possible by the assessment module.

As already explained in more detail above, the assessment is possible both from a temporal aspect and from a numerical aspect, that is the counting of revolutions performed by the at least one axis.

Other features which are considered as characteristic for the invention are set forth in the appended claims.

Although the invention is illustrated and described herein as embodied in a method and a system for determining a servicing requirement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
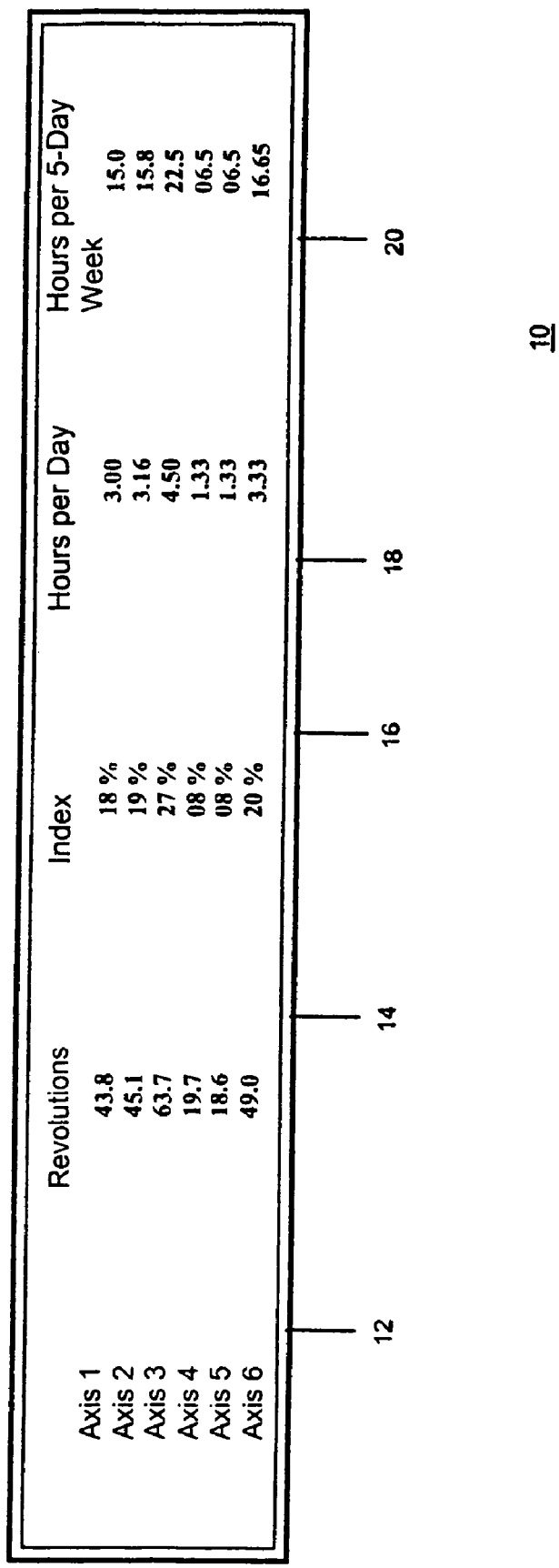
FIG. 1 is a table showing a distribution of the use of robot axes.

Referring now to the figures of the drawing in detail and first, particularly, to FIG. 1 thereof, there is shown a table 10, which contains data given by way of example for a six-axis robot, which originates from a production program which has a cycle time of 60 seconds and works 1000 cycles every 24 hours.

A first column 12 thereby designates the respective robot axes 1 to 6, the axes concerned being assigned values row by row. A second column 14 indicates for each axis an absolute value for established revolutions of the respective axis, which have been established within a cycle time of the production program. In a third column 16, the revolution values are entered as indexed values, here as percentage values corresponding to the proportionate use of the respective axes in the overall use, the sum of all the percentage values indicated amounting to 100%. In a fourth column 18, the absolute temporal values of the respective axis within a day are noted and, finally, in a fifth column 20, the absolute times of use of an axis during a working week, here a week with five working days, are indicated by a corresponding number of hours.

Table 10 makes it clear that the data required according to the invention, of a movement sequence of axes of a robot, are used initially to establish the rotational movements of the respective axes, or their proportions. However, the final method step of the method according to the invention, the assessment, is not evident from table 10. On the basis of the indication given in the third column 16 of the percentage of the revolutions of each axis as a proportion of the total number of revolutions, it is now possible to perform an assessment of the established rotational movements of each axis in various ways.

One possibility is to make the axis that undergoes the most movement, here the axis 3, the decisive axis in the chosen example, so that a calculation of the servicing interval is carried out on the basis of the 27% proportion of the total number of revolutions or on the basis of the absolute numbers of revolutions, that is here 63.7 revolutions for the axis 3, and to specify in this way, together with the historical data, that is the data indicating how many cycles have already been performed by the robot, in comparison with the recommended maximum number of revolutions according to the specifications of the manufacturer for when servicing is next due, the servicing interval as such or the remaining time period before a next servicing time.

Figure 2:
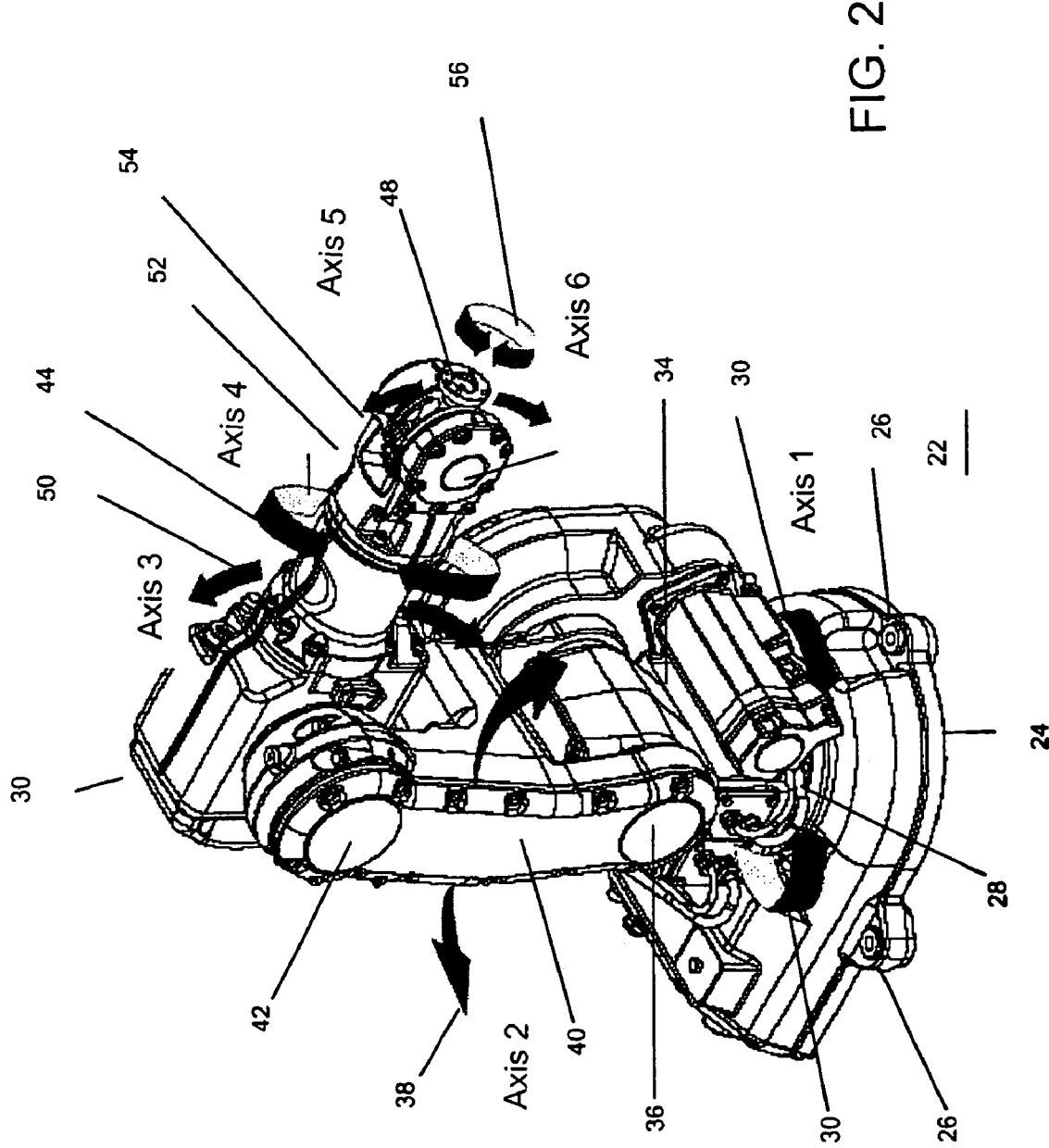
FIG. 2 is a diagrammatic, perspective view of an industrial robot with six axes.

FIG. 2 shows the example of a six-axis robot 22, which has various recesses 26 for fastening a robot foot 24 on a foundation.

By a first robot axis 28, a robot arm 30 is movable in the direction indicated by the first arrows 32. The robot arm 30 is turned as required about the first axis 28 by a motor and related transmission. The first axis 28 connects the robot foot 24 to a first knuckle 34.

As a second point, the first knuckle 34 is connected to a second robot axis 36, the latter making the robot arm 30 movable about the second robot axis 36 in the directions indicated by second arrows 38. The second robot axis 36 is also driven by a motor by a transmission, so that a robot control can also move the axis as desired to a predetermined position.

A second knuckle 40 is connected at its one end to the second robot axis 36, while its other end is connected to a third robot axis 42. The free part of the robot arm 30 is also rotatably mounted about the third robot axis 42, in turn with a construction comparable to that already described for the axes before, in each case with a motor and a transmission. A corresponding construction of the robot arm 30 is also realized for a fourth robot axis 44, a fifth robot axis 46 and a sixth robot axis 48, which respectively create the degrees of freedom for the movement of the robot 22 indicated by the third arrows 50, fourth arrows 52, fifth arrows 54 and sixth arrows 56.

If the longitudinal extent of the robot arm 30 is considered, beginning from the robot foot 24, it can be found that both the knuckles 34, 40 and so on and the form of the robot axes 28, 36, 42, 44, 46 and 48, their motors and their transmissions are configured to be smaller in each case after each knuckle, up to the free end of the robot arm 30, the last robot axis of which, the sixth robot axis 48, is configured as the mechanically weakest of the entire robot arm 30. This is a customary construction of such a robot 22, which is based on the idea that the sum of all the forces and torques of the entire robot arm 30 is to be removed into the robot foot 24 via the first robot axis 28. Depending on the tool which is attached to the robot 22, further forces resulting from the processing of work pieces with the tool are added to this. Such a tool is not represented in the figure, but it would be located at the extreme end of the free end of the robot arm 30.

Figure 3:
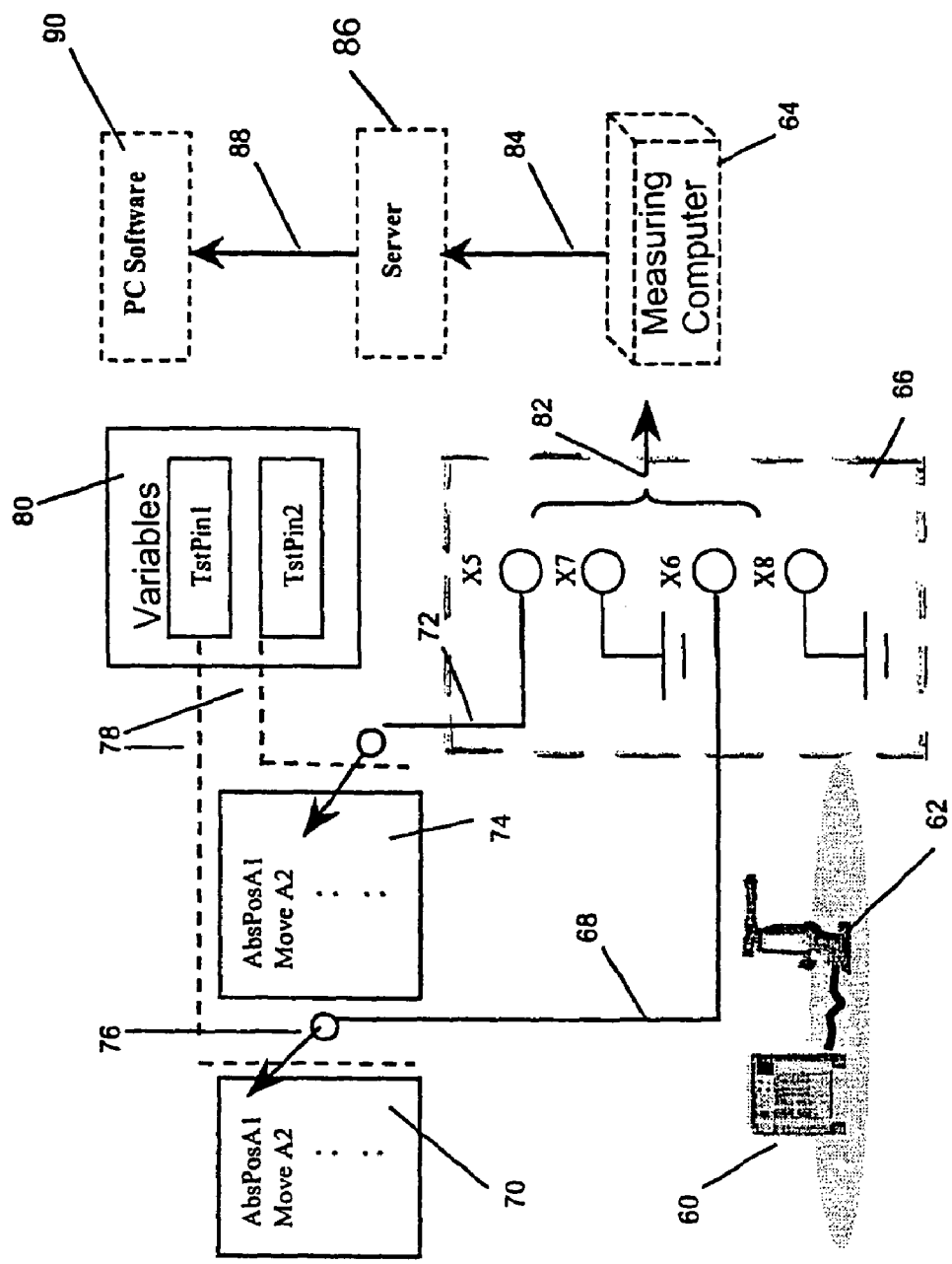
FIG. 3 is a block diagram of a configuration of an industrial robot and a system according to the invention.

FIG. 3 shows the example of an interface between a robot controller 60, which controls a robot 62, and a first system for determining a servicing requirement 64. An interface 66 between the robot controller 60 and the first system 64 is bordered by a frame of dashed lines and contains a number of interface points, which are denoted by X5, X6, X7 and X8. The interface 66 is in this case provided for tapping two signals of a robot axis, it being quite conceivable for an unrestricted number of signals and axes to be sampled via the interface.

In the chosen example, the side of the interface 66 on which the robot 62 and its control 60 are located is represented by the representation of the symbols for the robot 62 and its robot controller 60. On the side of the interface 66, a first data line 68 connects the connection point X6 to a first data selection switch 70 of the robot controller 60. In a comparable way, the connection point X5 is connected by a second data line 72 to a second data selection switch 74. Via a switching element 76, the first data line 68 can be switched either to a signal A1 of an absolute position of a first robot axis or a movement signal A2 of the first axis. In the chosen example, the switching element 76 connects the data line 68 to the signal A1 of the absolute position of the first axis.

As a difference from this, the second data line 72 is connected to the movement signal A2 for a first axis of the robot 62.

The chosen example therefore shows the wiring of the interface 66 to data from the robot controller 60 merely concerning one axis. It is quite conceivable for the data of a number of axes or all the axes of the robot 62 to be connected to a corresponding interface. The advantage of this wiring is that, in comparison with the absolute position of the axis, which represents the position in the current program that the robot 62 has to execute, a corresponding movement value can be respectively assigned.

For test purposes, as to whether the signals made available can also be transmitted without any errors to the interface 66, the first data selection switch 70 and the second data selection switch 74 are respectively connected to a testing device by the third data lines 78.

The interface 66 is also connected to the measuring computer 64, which is indicated by a first arrow 82. Furthermore, the measuring computer 64 is connected by a fourth data line 84 to a server 86 and the latter is connected by a fifth data line 88 to a PC 90. In the example represented, the measuring computer 64 has the task of interpreting the values of the robot axis made available at the interface 66 in analog form as values for a movement profile. The values prepared by the measuring computer 64 for the movement profile are transmitted to the PC 90 through the fourth data line 84, the server 86 and also the fifth data line 88.

With the arrangement represented in FIG. 3, the method according to the invention proceeds as follows. Data signals which are to be assessed as the absolute position of the first axis A1 are made available by the robot controller 60 at the connection point X6 via the first data line 68. In a comparable way, a value for the movement just performed by the first axis of the robot 62 is set up by the robot controller 60 via the second data line 72. Both values are sensed together with a timing signal by the measuring computer 64 and initially stored. The signal value for the absolute position of the first axis of the robot 62 is not absolutely necessary for the method according to the invention, but simplifies the interpretation of the measured values for the movement for an expedient form of the method according to the invention.

It is just as unnecessary that the measuring computer 64 stores the data received. These data could also be further processed immediately, that is online, and transmitted to the PC 90. However, here too it is expedient initially to store the measured values received for comparison purposes or for later comparative calculations, in order in this way also to have a copy of the original data available.

In this way, the entire torque profile of a complete working cycle of the robot 62 is transmitted to the PC 90. The latter also initially stores the received movement profile of the first axis. In the chosen example, the working cycle of the robot 62 is to contain, in the first step, the action of moving to and gripping a work piece. The second working step is the action of raising the work piece and subsequently bringing it to an end position for the work piece. Finally, the third working step for the robot 62 consists in that the work piece is released and the robot arm is moved back into its starting position, so that the then completed working cycle could be repeated.

The working cycle defined by the working steps is initially represented as a movement profile on the display device of the PC 90. Each movement or each element of the movement of the axis is detected as such, analyzed and counted, and undergoes an assessment in a subsequent method step.

In one possible assessment step, the sum of the elements of movement for each axis within a specific time, predetermined by the working cycle, is formed as a measure for the assessment.

Another possibility is that the proportionate times of the movements of individual axes as a percentage of an overall movement time of all the axes (=100%) is used. Altogether, this, possibly additionally provided with an empirically determined factor, is used to appraise the current servicing requirement caused by such a working cycle.

The simplest servicing requirement that can be appraised by the method according to the invention is therefore a requirement based on a working cycle. With the knowledge of the previously completed working cycles of the robot 62, the current servicing state of the robot 62, or of the first axis concerned, is then also concluded according to the invention. On the basis of this appraisal, a statement relating to the time period for which this robot axis can continue to be operated with the presently defined working cycle is then also made possible.

Figure 4:
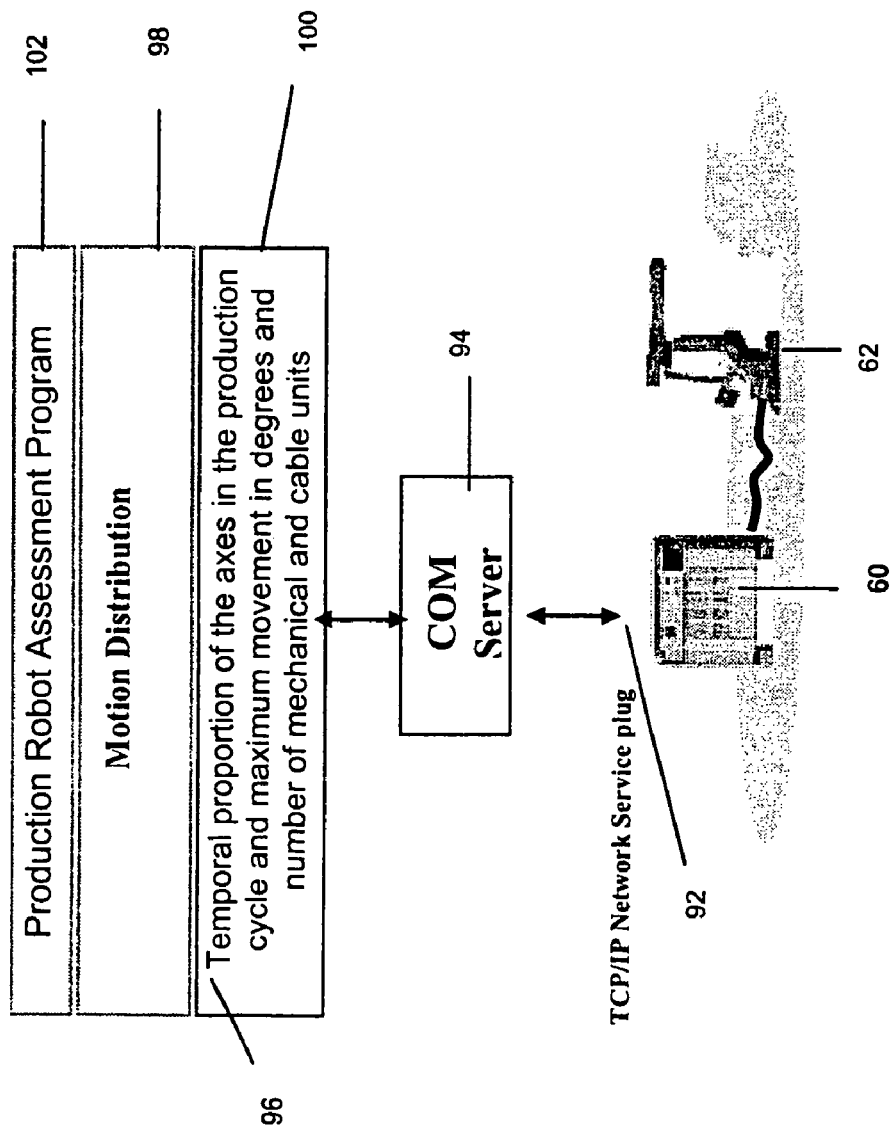
FIG. 4 is a block diagram of a data structure of a configuration of the industrial robot with the system according to the invention.

FIG. 4 shows the example of a data flow from the robot controller 60 of the robot 62 via a TCP/IP interface 92, through which the data can be fed from the robot controller 60 to a TCP/IP network 94. The TCP/IP network 94 therefore connects an evaluation device 96 to the robot controller 60. This example shows that the evaluation device 96 can be connected from the robot controller 60 location-independently by use of the network 94 in the chosen example, this is a TCP/IP network 94. However, it is equally conceivable for the interface 92 to be integrated into other networks, for example for the interface 92 to be an Internet interface, so that the network 94 is formed by the Internet, and the evaluation device 96 can consequently be anywhere in the world without local restriction.

In the chosen example, the system according to the invention for determining a servicing requirement of axes of a robot arm of an industrial robot is realized with all its modules in the evaluation device 96. The movement profile is accordingly passed in the form of the data made available to the robot controller 60 from the interface 92 via the network 94 to the evaluation device 96. There, the data obtained are initially received by a data collector 98 and recorded and possibly stored as movement data or other data, such as for example maximum movement of the axes in degrees, number of mechanical movements or number of cable units or an assessment variable for moved cables, in particular also in their temporal relationship. In this way, it is possible for a processing module 100 to interpret the data made available by the data collector 98 as elements of movement of individual axes for a comparison of these elements, for the maximum value detection and for the representation of the data as curves and so on. In a further module, an assessment module 102, the values, the elements of movement or specific aspects of the same are assessed as a servicing requirement, so that, at the end of the method according to the invention, a statement can be made concerning which individual servicing requirement a specific axis of the robot 62 has on the basis of particularly frequent movements or correspondingly small elements of movement. These data together with other data from production, servicing or the robot movement program, as indicated in FIG. 4 in the movement module 102, altogether improve the quality of the statement concerning the servicing requirement or the servicing requirement of individual axes.

Figure 5:
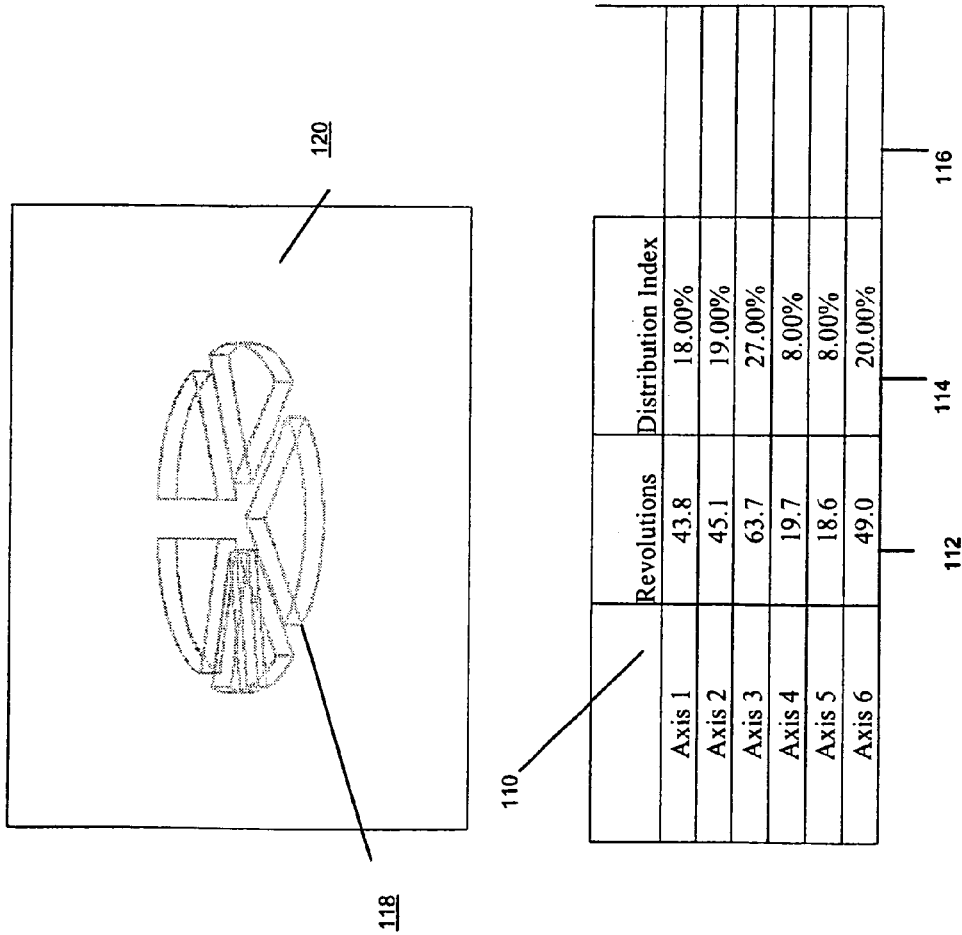
FIG. 5 is a graphically expressed representation of the proportionate uses of robot axes.

FIG. 5 shows on the basis of the numerical example from FIG. 1 a graphic expression of the data. Shown for this purpose in FIG. 5 is a second table 110, the first table column 112 of which contains the same indications as the first column 12. The same correspondingly applies to the second table column 114 and the third table column 116, their content corresponding to the contents of the second column 14 and the third column 16. Above the second table 110, the content of this table is expressed as a pie chart 118 and is provided with an index 120, which identifies the segments, represented for example in color, of the pie chart 118 with a name of an axis.

The following example is also intended to illustrate the method according to the invention. The data of a movement sequence of a robot axis are recorded by a data recording unit, for example a measuring computer. For this purpose, the latter is connected to a suitable interface on the robot or the robot control. The data concerning the movement sequences of the various robot axes during the production program for this robot are then recorded and stored. The evaluation of the data obtained takes place by the analysis of the proportion of time of the revolutions of the motor or corresponding proportions of the axes, corresponding to the recorded values and the analysis or detection of special loads to which the individual axes are subjected and an indication of the maximum values achieved. On the basis of the assessment of these data according to the invention, preventive measures or maintenance proposals are made possible for the individual axes. Detecting special loads makes it possible to suggest proposals for their avoidance, for example a proposal of alternative movements of the robot movement sequences, reducing the respective special loads in a way corresponding to the production program. In this way, a use-based lubricating procedure can also be established for each axis.

The method according to the invention can be improved even further by the values obtained by other measurements, such as transmission backlash, performance, work or maximum torque for example, being implemented in the production cycle of an industrial robot. In this way, the causes of the axial loading can be determined correspondingly more accurately and the effects on wear and the establishment of a servicing interval can be determined correspondingly accurately.

In the example given above, the evaluation will take place on the basis of the number of revolutions of the motor in temporal relation to the current production program. The assessment is indicated in percentages. On this basis, the use-based lubricating procedure of the axes is calculated as a servicing interval in dependence on the use per unit of time, for example a day, week, month or a year, in the unit of "hours". Taking into account axis-specific parameters, such as the use of a transmission factor for example, which is empirically determined, the maximum permissible movement of an axis is determined.

This application claims the priority, under 35 U.S.C. §119, of German patent application No. 10 2004 028 565.9, filed Jun. 15, 2004; the entire disclosure of the prior application is herewith incorporated by reference.

We claim:

1. A method for determining a servicing requirement of axes of a robot arm of an industrial robot, which comprises the steps of:
    making available data of a movement sequence of at least one axis during at least one working cycle of the industrial robot;
    determining rotational movements of the at least one axis on a basis of the data of the movement sequence;
    determining a servicing interval for the at least one axis by an assessment of the rotational movements;
    performing at least one of measuring the data of the movement sequence and reading out the data of the movement sequence from a data memory;
    carrying out the assessment on a basis of temporal proportions of a rotational movement or on a basis of a number of revolutions;
    using movement sequences of all the axes for determining the service interval; and
    determining a common servicing interval for all the axes by the assessment of an axis which, in absolute or relative terms, has a highest assessment.

2. The method according to claim 1, which further comprises representing at least one of the movement sequences, an absolute assessment, and a relative assessment on a display device.

3. The method according to claim 1, which further comprises determining a servicing time for the axis or a common servicing time for all the axes by taking into account the servicing interval determined together with a number of working cycle completed so far.

4. The method according to claim 1, which further comprises
    using axis-specific parameters selected from the group consisting of a type of motor of a drive motor of the axis, a size of the motor of the drive motor of the axis, a transmission of the axis, a transmission backlash, a performance or work or maximum torque in a production cycle, for determining the servicing interval.

5. The method according to claim 4, which further comprises determining the axis-specific parameter empirically or by a neural method.

6. A system for determining a servicing requirement of axes of a robot arm of an industrial robot, the system comprising:
- a data module containing data of movement sequences of all the axes of the robot arm during at least one working cycle of the industrial robot;
- an analysis module for analyzing rotational movements of the at least one axis from the data; and
- an assessment module for determining a servicing interval for the robot arm by performing an assessment of the rotational movements, said assessment module additionally determining a common servicing interval for all the axes by the assessment of an axis which, in absolute or relative terms, has a highest assessment.

7. The system according to claim 6, further comprising a robot controller, and at least one of said data module, said analysis module and said assessment module is disposed in said robot controller.

8. The system according to claim 6, further comprising an evaluation device connected to a robot controller of the industrial robot, and at least one of said data module, said analysis module and said assessment module, is disposed in said evaluation device.

9. The system according to claim 7, wherein the data of the movement sequence can be read out from the robot controller as direct or indirect values.

10. The system according to claim 6, wherein said data module, said analysis module and said assessment module are in each case computer program products.

* * * * *